United States Patent
Sarikaya et al.

(10) Patent No.: US 9,210,735 B2
(45) Date of Patent: Dec. 8, 2015

(54) NETWORK ADDRESS TRANSLATION SIX TO FOUR FOR PROXY MOBILE INTERNET PROTOCOL VERSION SIX

(75) Inventors: Behcet Sarikaya, Wylie, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1168 days.

(21) Appl. No.: 13/170,545

(22) Filed: Jun. 28, 2011

(65) Prior Publication Data

US 2012/0005372 A1    Jan. 5, 2012

Related U.S. Application Data

(60) Provisional application No. 61/361,254, filed on Jul. 2, 2010.

(51) Int. Cl.
| | | |
|---|---|---|
| *H04W 80/04* | (2009.01) | |
| *H04L 29/12* | (2006.01) | |
| *H04W 88/18* | (2009.01) | |

(52) U.S. Cl.
CPC ........... *H04W 80/045* (2013.01); *H04L 61/251* (2013.01); *H04L 61/2553* (2013.01); *H04L 61/1511* (2013.01); *H04W 88/182* (2013.01)

(58) Field of Classification Search
CPC  H04W 56/00; H04L 12/749; H04L 29/06142
USPC ........................................................ 709/245
See application file for complete search history.

(56) References Cited

U.S. PATENT DOCUMENTS

| | | | | |
|---|---|---|---|---|
| 7,401,169 | B2* | 7/2008 | Holbrook ........................ | 710/52 |
| 2004/0136382 | A1* | 7/2004 | Sundquist ...................... | 370/400 |
| 2005/0013280 | A1* | 1/2005 | Buddhikot et al. ........... | 370/349 |
| 2005/0068981 | A1* | 3/2005 | Park et al. ..................... | 370/466 |
| 2007/0171930 | A1 | 7/2007 | Kamata et al. | |
| 2008/0059582 | A1* | 3/2008 | Hartikainen et al. ......... | 709/204 |
| 2008/0107060 | A1* | 5/2008 | Andou et al. ................. | 370/312 |
| 2010/0177698 | A1 | 7/2010 | Salmela et al. | |
| 2011/0216680 | A1 | 9/2011 | Vogt et al. | |

FOREIGN PATENT DOCUMENTS

| | | |
|---|---|---|
| CN | 101005390 A | 7/2007 |
| CN | 101212397 A | 7/2008 |

(Continued)

OTHER PUBLICATIONS

S. Venaas, an Ipv4-Ipv6 multicast tranlator, Jul. 8, 2009 p. 1-12.*

(Continued)

*Primary Examiner* — Jeffrey Nickerson
*Assistant Examiner* — Joseph M Cousins
(74) *Attorney, Agent, or Firm* — Conley Rose, P.C.; Grant Rodolph

(57) ABSTRACT

An apparatus comprising a Local Mobility Anchor (LMA) configured to couple to a mobile node (MN), a network address translation (NAT) server, and an Internet Protocol (IP) version four (IPv4) only host and to associate an IP version six (IPv6) address for an interface with the MN with an IPv4 address for an interface with the IPv4 only host in a NAT state table entry, wherein the NAT state table entry is used to translate an IPv6 packet associated with the MN to an IPv4 packet associated with the IPv4 only host.

23 Claims, 6 Drawing Sheets

(56) References Cited

FOREIGN PATENT DOCUMENTS

| CN | 101702800 A | 5/2010 |
|---|---|---|
| WO | 2008151672 A1 | 12/2008 |
| WO | 2010054686 A1 | 5/2010 |

OTHER PUBLICATIONS

S. Gundavelli, Proxy Moblie Ipv6, Aug. 2008, p. 9-10, 61-62.*
S. Deering, Internet protocol, Version 6 sepcification Dec. 1998, p. 18-23.*
A. Muhanna, RFC 5845: Generic Routing Encapsulation Key Option for Proxy Mobile IPv6. Jun. 2010 p. 13-22.*
Makela et al , Home Agent assisted route optimization between mobile ipv4 networks draft-ietf-mip4-nemo-haaro-00, Feb. 19, 2010, p. 14-18, 33-35.*
Lam et al., The Design and Implementation of an IPv6/IPv4 Network Address and Protocol Translator, Jun. 11, 1998, p. 1-16.*
Audet, F., Ed., "Network Address Translation (NAT) Behavioral Requirements for Unicat UDP," RFC 4787, Jan. 2007, 30 pages.
Bao, C., et al., "IPv6 Addressing of IPv4 / IPv6 Translators," RFC 6052, Oct. 2010, 19 pages.
Bradner, S., "Key Words for Use in RFCs to Indicate Requirement Levels," RFC 2119, Mar. 1997, 3 pages.
Guha, S., Ed., et al., "NAT Behavioral Requirements for TCP," RFC 5382, Oct. 2008, 22 pages.
Gundavelli, S., Ed., et al., "Proxy Mobile IPv6," RFC 5213, Aug. 2008, 8 pages.
Johnson, D., et al., "Mobility Support in IPv6," RFC 3775, Jun. 2004, 155 pages.
Levkowetz, H., et al., "Mobile IP Traversal of Network Address Translation (NAT) Devices," RFC 3519, Apr. 2003, 32 pages.
Rose, M., "Writing I-Ds and RFCs using XML," RFC 2629, Jun. 1999, 29 pages.
Rosenberg, J., "Interactive Connectivity Establishment (ICE): A Protocol for Network Address Translator (NAT) Traversal for Offer/Answer Protocols," RFC 5245, Apr. 2010, 118 pages.
Srisuresh, P., et al., "IP Network Address Translator (NAT) Terminology and Considerations," RFC 2663, Aug. 1999, 31 pages.
Wakikawa, R., et al., "IPv4 Support for Proxy Mobile IPv6," RFC 5844, May 2010, 50 pages.
Bagnulo, M., et al., "DNS 64: DNS Extensions for Network Address Translation From IPv6 Clients to IPv4 Servers," draft-ietf-behave-dns64-09, Mar. 30, 2010, 33 pages.
Bagnulo, M., et al., "DNS 64: DNS Extensions for Network Address Translation From IPv6 Clients to IPv4 Servers," draft-ietf-behave-dns64-11, Oct. 1, 2010, 33 pages.
Bagnulo, M., et al., "Stateful NAT64: Network Address and Protocol Translation From IPv6 Clients to IPv4 Servers," draft-ietf-behave-v6v4-xlate-stateful-11, Mar. 30, 2010, 46 pages.
Bagnulo, M., et al., "Stateful NAT 64: Network Address and Protocol Translation From IPv6 Clients to IPv4 Servers," draft-ietf-behave-v6v4-xlate-stateful-12, Jul. 10, 2010, 46 pages.
Haddad, W., et al., "A Note on NAT64 Interaction With Mobile IPv6," draft-haddad-mext-nat64-mobility-harmful-01, Apr. 28, 2010, 11 pages.
Korhonen, J., Ed., et al., "Analysis of Solution Proposals for Hosts to Learn NAT64 Prefix," draft-korhonen-behave-nat64-learn-analysis-01.txt, Jan. 20, 2011, 26 pages.
Krishnan, S., Ed., et al., "Localized Routing for Proxy Mobile IPv6," draft-ietf-netext-pmip-lr-01, Oct. 20, 2010, 26 pages.
Li, X., et al., "IP/ICMP Translation Algorithm," draft-ietf-behave-v6v4-xlate-20, May 18, 2010, 34 pages.
Li, X., et al., "IP/ICMP Translation Algorithm," draft-ietf-behave-v6v4-xlate-23, Sep. 18, 2010, 34 pages.
Liebsch, M., et al., "PMIPv6 Localized Routing Problem Statement," draft-ietf-netext-pmip6-lr-ps-02.txt, Jan. 22, 2010, 18 pages.
Schmidt, T.C., et al., "Base Deployment for Multicast Listener Support in PMIPv6 Domains," draft-ietf-multimobpmipv6-base-solution-02, May 31, 2010, 21 pages.
Schmidt, T.C., et al., "Base Deployment for Multicast Listener Support in PMIPv6 Domains," draft-ietf-multimobpmipv6-base-solution-07, Dec. 29, 2010, 22 pages.
Venaas, S., et al., "An IPv4-IPv6 Multicast Translator," draft-venaas-behave-mcast46-01.txt, Jul. 8, 2009, 12 pages.
Venaas, S., et al., "An IPv4-IPv6 Multicast Translator," draft-venaas-behave-mcast46-02.txt, Dec. 22, 2010, 12 pages.
Kiviniemi, T., "Implementation of an IPv4 to IPv6 Multicast Translator," Helsinki University of Technology, Master's Thesis, Oct. 25, 2009, 81 pages.
Foreign Communication From a Related Counterpart Application, International Application No. PCT/CN20111076775, International Search Report dated Oct. 20, 2011, 3 pages.
Li, X., et al., "IP/ICMP Translation Algorithm," RFC 6145, Apr. 2011, 33 pages.
Bagnulo, M., et al., "Stateful NAT64: Network Address and Protocol Translation from IPv6 Clients to IPv4 Servers," RFC 6146, Apr. 2011, 45 pages.
Bagnulo, M., et al., "DNS64: Dns Extensions for Network Address Translation from IPv6 Clients to IPv4 Servers," RFC 6147, Apr. 2011, 32 pages.
Schmidt, T., et al., "Base Deployment for Multicast Listener Support in Proxy Mobile IPv6 (PMIPv6) Domains," RFC 6224, Apr. 2011, 19 pages.
Liebsch, M., Ed., et al., "Proxy Mobile IPv6 (PMIPv6) Localized Routing Problem Statement," RFC 6279, Jun. 2011, 14 pages.
Korhonen, J., Ed., et al., "Analysis of Solution Proposals for hosts to learn NAT64 prefix," draft-ietf-behave-nat64-learn-analysis-00.txt, May 23, 2011, 25 pages.
Haddad, W., et al., "A Note on NAT64 Interaction with Mobile IPv6," draft-haddad-mext-nat64-mobility-harmful-02.txt, Mar. 13, 2011, 10 pages.
Schmidt, T. C., et al., "Base Deployment for Multicast Listener Support in PMIPv6 Domains," draft-ietf-multimobpmipv6-base-solution-03.txt, Jun. 14, 2010, 20 pages.
Krishnan, S., et al., "Localized Routing for Proxy Mobile IPv6," draft-ietf-netext-pmip-lr-03.txt, Jun. 3, 2011, 25 pages.
Krishnan, S., et al., "Localized Routing for Proxy Mobile IPv6," draft-krishnan-netext-pmip-lr-01, Mar. 8, 2010, 16 pages.
Venaas, S., et al., "An IPv4-IPv6 Multicast Translator," draft-venaas-behave-mcast46-00.txt, Dec. 12, 2008, 8 pages.

* cited by examiner

NETWORK ADDRESS TRANSLATION SIX TO FOUR FOR PROXY MOBILE INTERNET PROTOCOL VERSION SIX

CROSS-REFERENCE TO RELATED APPLICATIONS

The present application claims the benefit of U.S. Provisional Patent Application No. 61/361,254 filed Jul. 2, 2010 by Behcet Sarikaya et al. and entitled "Network Address Translation for Mobile Internet Protocol," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wireless Fidelity (WiFi) based on the IEEE 802.11 standard, and Worldwide Interoperability for Microwave Access (WiMAX) based on the IEEE 802.16 standard. Mobile IPv6 (MIPv6) is a protocol that allows a mobile node (MN), such as a mobile device, to handle its mobility management. As such, the MN may communicate, e.g. via an access router (AR), with a MIPv6 home agent (HA) for the MN. Proxy Mobile IPv6 (PMIPv6) is a protocol that allows a MN to avoid handling its own mobility management. In PMIPv6, the mobility management of the MN can be handled by a mobile access gateway (MAG) that communicates with a PMIPv6 Local Mobility Anchor (LMA) on behalf of the MN in the network

SUMMARY

In one embodiment, the disclosure includes an apparatus comprising a LMA configured to couple to a MN, a network address translation (NAT) server, and an IP version four (IPv4) only host and to associate an IPv6 address for an interface with the MN with an IPv4 address for an interface with the IPv4 only host in a NAT state table entry, wherein the NAT state table entry is used to translate an IPv6 packet associated with the MN to an IPv4 packet associated with the IPv4 only host.

In another embodiment, the disclosure includes a network component comprising a receiver at a LMA configured to receive an IPv4 multicast data packet that comprises an IPv4 address from an IPv4 host, a processor at the LMA configured to translate the IPv4 multicast data packet into an IPv6 multicast data packet that comprises an IPv6 address based on the IPv4 address, and a transmitter configured to send the IPv6 multicast data packet to a mobile access gateway (MAG) associated with a plurality of MNs that are subscribed to the IPv6 address.

In yet another embodiment, the disclosure includes a network apparatus implemented method comprising receiving at a LMA an IPv6 packet from a MN, setting an IPv6-only flag in a binding cache entry (BCE) at the LMA for the MN that is not previously set if an IPv6 prefix in a destination address in the IPv6 packet is detected in a prefix table, translating the IPv6 packet to an IPv4 packet using a NAT state table entry that matches a source address in the IPv6 packet, and forwarding the IPv4 packet to an IPv4 only host associated with the destination address.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A plurality of techniques are being standardized for IPv6 migration, including a NAT 64 (NAT64) described in the Internet Engineering Task Force (IETF) Request for Comment (RFC) 6146, which is incorporated herein by reference. NAT64 may be used with a Domain Name System 64 (DNS64), as described in RFC 6147, which is incorporated herein by reference. NAT64 and DNS64 may enable IPv6-only hosts to communicate with IPv4-only hosts or servers. NAT64 was designed for fixed hosts and several problems may occur when used for MNs, as described in draft-haddad-mext-nat64-mobility-harmful-02, March 2011 by W. Haddad et al. entitled "A Note on NAT64 Interaction with Mobile IPv6", which is incorporated herein by reference.

Disclosed herein are systems and methods for implementing NAT64 with Proxy Mobile IPv6 (PMIPv6) to support MN mobility. The methods may allow an IPv6-only MN that receives host based mobility management using PMIPv6 to communicate with IPv4-only servers or hosts. The system may comprise a LMA and a NAT64 server that may be collocated or hosted separately in the system. The system may be configured to handle prefix change or mismatch, e.g., when the MN moves to a new network and establishes an interface with a new local MAG. Prefix change may be handled using a NAT state table at the LMA that associates IPv6 addresses with IPv4 addresses. The NAT state entries may also be linked to corresponding binding cache entries for corresponding MNs. An improved keep-alive mechanism may also be used to preserve battery power on the MN. The system may also support multicast in PMIPv6 to enable the IPv6-only MN to receive multicast data from an IPv4-only server. Additionally, localized routing between MAGs may be used to avoid reverse tunneling packets from a MN to the LMA.

Figure 1:
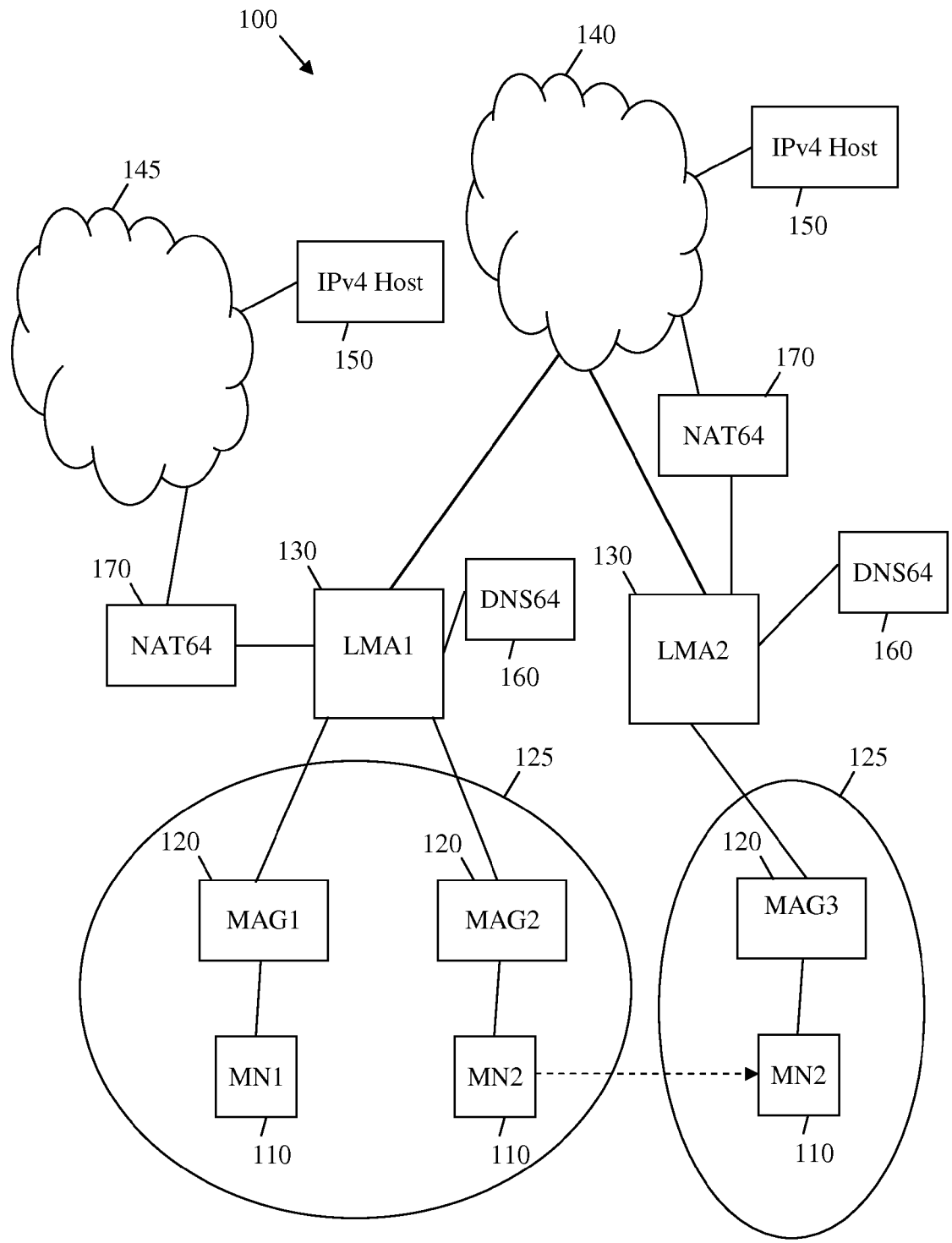
FIG. 1 is a schematic diagram of one embodiment of a wireless access network system.

FIG. 1 illustrates an embodiment of a wireless access network system 100, which may support PMIPv6 to handle MN mobility. The wireless access network system 100 may comprise a plurality of MNs 110, one or more MAGs 120 that may be coupled to one or more MNs 110, and a plurality of LMAs 130 that may be coupled to the MAGs 120. The MNs 110 and the MAGs 120 may be located in a plurality of wireless access networks 125, also referred to herein as domains. Additionally, the wireless access network system 100 may comprise one or more DNS64 servers 160 that may be coupled to the LMAs 130, and a plurality of NAT64 servers 170 that may be coupled to or collocated (in a network node or entity) with the LMAs 130. The wireless access network system 100 may also comprise a service provider network 140 and one or more external networks 145 coupled to the LMAs 130, and a plurality of IPv4 servers or hosts 150 coupled to the service provider network 140 and the external networks 145.

The MNs 110 may be any mobile devices that use the MAGs 120 and the LMAs 130 to access the server provider network 140, external networks 145, or other networks (not shown). Specifically, the MNs 110 may comprise mobile user-oriented devices that communicate with the service provider network 140 and the external networks 145. For example, the MNs 110 may comprise cellular telephones, notebook computers, personal digital assistants (PDAs), any other wireless devices, or combinations thereof. Additionally or alternatively, the MNs 110 may comprise fixed communications devices, such as desktop computers or set top boxes, which may be connected to the LMAs 130 via the MAGs 120 using wireless technology.

The MNs 110 may be located in one or more wireless access networks 125, e.g., within the coverage range of the wireless access networks 125, which may allow access to the service provider network 140. The wireless access networks 125 may also comprise, or may be coupled to, the LMAs 130 and the MAGs 120. The wireless access networks 125 may be any wireless networks that exchange communications with the MNs 110, the MAGs 120, and the service provider network 140 via the LMAs 130. Examples of wireless access networks may include a Third Generation Partnership Project (3GPP) network and an IEEE 802.11 Wireless Local Area Network (WLAN), also referred to as WiFi network. For example, a first MN 110 (MN1) may be coupled to a first LMA 130 (LMA1) via a first MAG 120 (MAG1) and a second MN 110 (MN2) may be coupled to LMA1 via a second MAG 120 (MAG2) in a first wireless access network 125. MN2 may then move or migrate from the first wireless access network to a second wireless access network 125, e.g., using a hand-over procedure. As such, the MN2 may disconnect from LMA1 and MAG2 and establish a new active interface with LMA2 via MAG2. The dashed lines in FIG. 1 represent the migration of MN2 from the first wireless access network 125 to the second wireless access network 125.

The MAGs 120 may be any devices or components that are configured to provide the MNs 110 access to the service provider network 140 via the LMAs 130. The MAGs 120 may be located in one or more wireless access networks 125 that communicate with the service provider network 140. The MAGs 120 may also be configured to handle mobility management for the MNs 110 based on the PMIPv6 protocol. The LMAs 130 may be any devices or components that provide connectivity and/or external access to the MNs 110 via the wireless access network 125 and the service provider network 140. The LMAs 130 may also allow the MNs 110 to communicate with the external networks 145, such as the Internet or any other type of networks. The LMAs 130 may be configured to support the PMIPv6 protocol to enable mobility for the MNs 110. The LMAs 130 may forward one or more flows to the MNs 110 via any of the MAGs 120 that may have an active interface with the MNs 110. Mobility management may comprise binding traffic flows, such as IPv6 and/or IPv4 traffic flows, to any wireless access network where the MNs 110 may establish an active interface. The flows may correspond to services provided to the MNs 110 by the service provider network 140 and/or other external networks 145. The flows may be bound using a binding cache at each LMA 130. A binding cache may comprise one or more BCEs that map the destination addresses in the packets to the MAGs 130 that are associated with the MNs 110. Each BCE may map a MN 110 address (e.g., IPv6 address) to a MAG 120 care-of-address (CoA) that is associated with the MN 110.

The service provider network 140 may be any network that provides services to the MNs 110, e.g., via the wireless access networks 125. For instance, the service provider network 140 may be an Internet Service Provider (ISP), a network service provider (NSP), an application service provider (ASP), or combinations thereof. The services may be provided to the MNs 110 in the form of upstream and/or downstream IP packets, such as IPv6 packets and/or IPv4 packets, and may comprise data, text, voice, video, and/or any other services. The packets may be part of an IPv6 and/or IPv4 flow that may be identified by a source IP address, a destination IP address, a transport protocol number, a source port number, a destination port number, or combinations thereof. The services may be directed between the service provider network 140 and the wireless access networks 125 using the LMAs 130.

The service provider network 140 and the external networks 145 may comprise, or may be coupled to one or more IPv4 hosts 150 and optionally one or more IPv6 hosts (not shown). The IPv4 hosts 150 may be IPv4-only hosts or servers that send and/or receive IPv4 packets and services to the MNs 110 but do not communicate IPv6 packets and services. The IPv4 packets may comprise IPv4 addresses, which may be about 32 bits long. The IPv4 packets may be sent to IPv4 and/or IPv6 MNs 110. At least some of the MNs 110 may be IPv6-only hosts that send and/or receive IPv6 packets but not IPv4 packets.

The DNS64 server 160 and the NAT64 servers 170 may be configured to enable IPv6-only hosts, such as a MN 110 that is assigned an IPv6 address, to communicate with IPv4-only hosts or servers that handle IPv4 but not IPv6 addresses, such as the IPv4 host 150. One or more DNS64 servers 160 may assign an IPv6 prefix for each NAT64 server 170. The NAT64 servers 170 may use the assigned IPv6 prefixes to translate the IPv4 addresses and packets from one or more IPv4 hosts 150 into IPv6 addresses and packets for the MNs 110. The packets may be translated and forwarded in the direction from the MNs 110 to the IPv4 host 150 and vice versa.

One of the issues of implementing NAT64 in PMIPv6 is handling the mobility of the MNs 110, such as when the MNs 110 move between different wireless access networks 125. The DNS64 server 160 may use the IPv6 prefix assigned to the NAT64 IPv6 170 interface in the domain or wireless access network 125 to translate IPv4 addresses to corresponding IPv6 addresses and vice versa. The IPv6 prefix is referred to herein as Pref64, as in described in RFC 6146. IETF RFC 6052, which is incorporated herein by reference, defines two types of prefixes: a well-known prefix and a network-specific prefix (NSP). If a well-known prefix (e.g., 64:FF9B::/96) is used, then the MN 110 may get the same mapping when moving or migrating between different wireless access networks 125.

If NSPs are used instead, then a prefix mismatch situation may need to be addressed for the MNs 110, as described in draft-ietf-behave-nat64-learn-analysis, May 2011 by J. Korhonen et al. entitled "Analysis of Solution Proposals for Hosts to Learn NAT64 Prefix", which is incorporated herein by reference. The prefix mismatch situation may result from the MNs 110 using different NSPs assigned by the DNS64 servers 160 than the NSPs configured for the NAT64 servers 170. For example, a MN 110 may move to a wireless access network 125 associated with a NAT 64 server 170 that is configured with a NSP and then obtain from the DNS64 server 160 a different NSP.

When the MN 110 moves from a first wireless access network 125 to a second wireless access network 125 or new domain, the MN 110 may send a DNS request to obtain a NSP. The MN 110 may send the DNS request to a new MAG 120 in the new domain, which may forward the DNS request to the DNS64 server 160 in the domain. In this case, the NSP in the IPv6 address assigned to the MN 110 by the DNS64 server 160 may not be recognized by the NAT64 server 170 in the domain, which may prevent IPv6 packets from reaching the destination of the IPv4 server or host 150. To avoid the prefix mismatch problem, the LMAs 130 may be configured to keep track of the MNs' mobility by maintaining the address prefixes (IPv6 prefixes) used by the MNs 110, as described below.

To support mobility, the LMA 130 may be configured, cache when forwarding a packet sent by the MN 110, to check a source address field of the packet in its binding. If a match is found, the LMA 130 may check if the prefix of a destination address in the packet matches a Pref64 in a prefix mapping (e.g., a prefix table) of the LMA 130. In case of a match, the LMA 130 may set an IPv6-only flag in the binding cache entry that corresponds to the MN 110 if the flag was not already set.

In an embodiment, the LMA 130 and the NAT64 server 170 may be colocated, e.g., in the same network component or entity. As such, the LMA 130 may create an entry in a "NAT state" table that associates a MN source address and IPv6 source port pair with an IPv4 interface address and an IPv4 source port, such as <MN source address, IPv6 source port> <--> <IPv4 Interface address, IPv4 source port>. The LMA 130 may link the NAT state entry to the LMA's BCE for the MN 110. The LMA 130 may also add to this NAT state entry a keepalive interval, K (e.g., an integer), which may be used to ensure that the LMA 130 or the collocated NAT64 server 170 initiates NAT keepalive messages, e.g., periodically based on the interval K, instead of the MN 110 to refresh the NAT state entry. Since the MN 110 may not need to initiate the keepalive messages, the MN 110 may stay longer in a dormant or sleep mode and thus preserve its battery power. The keepalive mechanism is described in more detail below.

The LMA 130 may forward the IPv6 packets from the MN 110 to the NAT64 server 170, which may translate the IPv6 packets into IPv4 packets. If the NAT64 server 170 and the LMA 130 are collocated, then the LMA 130 may translate the IPv6 packets into IPv4 packets using the algorithm described in RFC 6145, which is incorporated herein by reference. The IPv4 packets may then be sent to the IPv4 host 150. The LMA 130 may also include the IPv6-only flag and the Pref64 in the NAT state, which may be linked to the BCE for the MN 110.

When forwarding subsequent packets for the same (e.g., unexpired) session corresponding to <MN source address, source port>, the LMA 130 may locate the corresponding entry in the NAT state table and create the corresponding IPv4 packet using this entry. The procedure above for creating a new NAT state may be repeated when a new session is started by a MN 110, e.g., when a new MN 110 attaches to the LMA 130 or when a previous NAT state entry for the MN 110 has expired and the MN 110 starts sending IPv6 packets again.

In the case of collocated LMA 130 and NAT64 server 170, when the LMA 130 receives an IPv4 packet from the IPv4 host 150 that is addressed to its IPv4 interface, the LMA 130 may search the NAT table for a corresponding MN IPv6 source address and port. For example, the tuple <203.0.113.1, 2000> may be matched to the NSP of 2001:FF00::/64 and a source port of 1500. The LMA 130 may create an IPv6 packet from the IPv4 packet using this information. The IPv4 packet may be translated into an IPv6 packet using the algorithm described in RFC 6145. The LMA 130 may then fetch the MN's BCE and find the care-of address of the MAG 120 for the MN 110. The LMA 130 may encapsulate the IPv6 packet and send it to the corresponding MAG 120, which may then forward the packet to the MN 110, e.g., after decapsulating the packet.

In another embodiment, the LMA 130 and the NAT64 server 170 may be hosted separately or may not be collocated. As such, the NAT64 server 170 may translate the received IPv4 packets and forward the packets as IPv6 packets to the LMA 130. The LMA 130 may then search its binding cache to match the IPv6 packet with a care-of address for the MN 110. If a match is found, the LMA 130 may encapsulate the packet and send it to the corresponding MAG 120. The MAG 120 may then decapsulate the IPv6 packet and send it to the MN 110.

As described above, the NAT64 server 170 may translate IPv6 packets into IPv4 packets and vice versa using the translation algorithm described in RFC 6145. However, the translation algorithm may be deficient in that IPv6 extension headers (e.g., except a fragmentation header) and IPv4 options are not translated. This may not be suitable for PMIPv6, where an extension header may be used in registration signaling, e.g., using PBU/PBA messages. To avoid the deficiency of the translation algorithm, the proxy binding update (PBU)/proxy binding acknowledgement (PBA) messages may be supported or allowed between the MAGs 120, e.g. for Localized Routing and the LMAs 130 but not between the MNs 110 and corresponding entities communicating with the MNs 110 in the wireless access network system 100.

According to the PMIPv6, the home address of the MN 110 may not change even if the MN 110 moves to a new wireless network or domain, e.g., via a handover procedure. If the MN 110 moves within the same domain that is served by the same DNS64 160, the MN 110 may continue to send/receive packets with the IPv4 servers or hosts 150, where IPv6 packets may be translated into IPv4 and vice versa, as described below.

If the MN 110 moves to a new domain that has a different DNS64 server 160, the MN 110 may initiate communications with an IPv4 server or host 150 and receive a different synthetic quad A address record (AAAA RR) that comprises a different IPv6 address of the destination. This situation may create a prefix mismatch problem. To handle this situation, the MN 110 may send its IPv6 packet to the local MAG 120, which may tunnel the IPv6 packet to the associated LMA 130. The LMA 130 may check for the source address (e.g., the MN's home address) of the packet in its binding cache for any entry that has an IPv6 flag that is set. If a match is found, the LMA 130 may check for the prefix of the destination address of the packet in its binding cache. If a match for the prefix is not found, then the LMA 130 may check for the prefix in a list of Pref64 values that may be supported by the LMA 130. If a match is found, a new BCE that comprises the prefix (e.g., a Pref64) may be added. The LMA 130 may then be responsible for routing the MN's packet with the added Pref64. However, the packet may be routed on a longer path to reach its destination (e.g., IPv4 host 150) or may not reach its destination if there is not an existing roaming agreement with the external network 145 of the IPv4 host 150. If there is no match for the prefix, then the packet may be intended for another IPv6 host and hence may be forwarded by the LMA 130. Alternatively, if a match for the prefix is found in the binding cache but with an IPv6-only flag that is not set, then the received packet may be a first packet sent to a new IPv4-only server. In this case the LMA 130 may translate and forward the packet, as described above.

Another issue of implementing NAT64 in PMIPv6 is efficient handling of the keepalive procedure for NAT entries during active MN sessions. Typically, the NAT64 server 170 may maintain a NAT state table. The NAT state may be a "soft" state that may expire if it is not refreshed during a determined time interval. The NAT state table may comprise one or more mapping or binding entries for one or more corresponding MNs 110, which may be deleted at the end of the time interval if no activity is detected during that interval. The time interval may be determined using timer values, e.g., at a minimum of about two minutes and a maximum of about five minutes for a User Datagram Protocol (UDP) as described in RFC 4787, which is incorporated herein by reference, and of about two hours and four minutes as described in RFC 2663 for a Transmission Control Protocol (TCP) described in RFC 5382, also both incorporated herein by reference. However, some typically used NAT64 servers or devices may have non-deterministic and relatively short expiration times, such as in the case of UDP-based bindings.

Typically, the MN 110 may initiate an outbound refresh to keep the mapping or binding entry for the MN 110 alive. The MN 110 may send a NAT keepalive message, as described in RFC 5245, which is incorporated herein by reference. The MN 110 may go to sleep mode when inactive to reduce battery usage. However, sending NAT keepalive messages for outbound refresh may interrupt the sleep mode and thus drain the MN's 110 battery. To avoid draining the battery, the MN 110 may not be allowed to send NAT keepalive messages. Instead, the NAT state at the NAT64 server 170 may be integrated with the binding cache at the LMA 130. The LMA 130 may refresh the binding entry for the MN 110 and send keepalive messages instead of the MN 110 to the NAT64 server 170 to refresh the NAT state at the NAT64 server 170, e.g., to keep track of the mobility of the MN 110.

Figure 2:
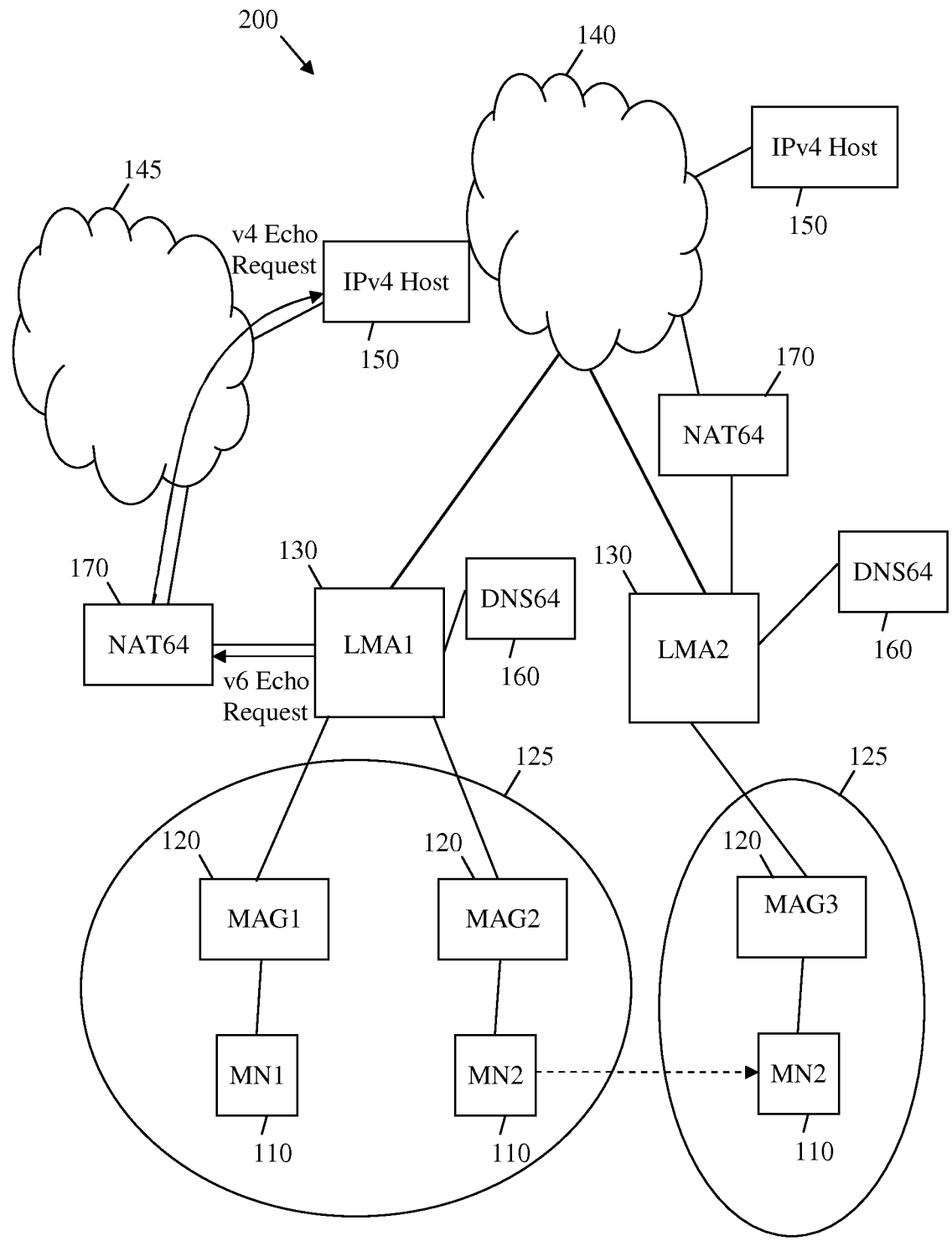
FIG. 2 is a schematic diagram of one embodiment of a keepalive scheme.

FIG. 2 illustrates an embodiment of a keepalive scheme 200 that comprises using NAT keepalive messages in the wireless access network system 100. The NAT keepalive messages may be Internet Control Message Protocol (ICMP) Echo Request messages, as described in RFC 3519, which is incorporated herein by reference. An ICMP version six (ICMPv6) Echo Request message may be encoded with a UDP header. The packet's destination address may be the destination address associated with the keepalive interval. The packet's source address may be the MN's 110 home address. The keepalive interval may be used to keep track of the inactivity of the MN's 110 session with the corresponding NAT64 server 170 and the corresponding IPv4 host 150. The UDP header in the message may comprise the source and destination port numbers of the NAT binding at the NAT64 server 170. The LMA 130 may send the ICMP Echo Request message to the NAT64 server 170 that serves as an outbound refresh message for the MN 110 session. The LMA 130 may also receive a corresponding ICMP Echo Reply message from the NAT64 server 170 that serves as an inbound refresh message, e.g., for incoming packets from the IPv4 host 150.

The ICMPv6 Echo Request message may be translated, e.g., encoded, at the NAT64 server 170 into an ICMP version four (ICMPv4) Echo Request message with a UDP header based on the translation rules defined in RFC 6145. The UDP header may preserve the source and destination port numbers that may be needed to match with a NAT state entry or binding. The NAT64 server 170 may also refresh the NAT state for this session. An ICMPv4 Echo message may be sent to the IPv4 host 150 as an IPv4 packet with a UDP header. The ICMPv6 Echo message and the ICMPv4 Echo message are indicated by solid line arrows in FIG. 2. The IPv4 host 150 may send in return an IPv4 Echo Reply message, which may be translated into an ICMPv6 Echo Reply message that is forwarded to the LMA 130.

A keepalive interval of K seconds may be implemented to control the frequency of the keepalive messages. K is a protocol constant that may be equal to a determined or default integer value. The default value may be less than the timeout value used by the NAT64 server 170. For instance, K may be set to the default value of about 110 seconds, as described in RFC 3519. The LMA 130 may forward any subsequent packets for the same session that corresponds to <MN source address, source port> and refresh the keepalive interval. The LMA 130 may not implement an inbound refresh and may not forward an ICMPv6 Echo Reply messages to the MN 110. The incoming packets for this session may not trigger a refresh of the keepalive interval, since this interval is designated for outbound refresh. Instead, the IPv4 host 150 may be in charge of implementing the inbound refresh.

Another issue of implementing NAT64 in DSMIPv6 is supporting multicasting packets from an IPv4-only host to IPv6-only MNs. Typically, the NAT64 protocol is designed for unicast communications and the translation algorithm defined in RFC 6145 may not translate multicast packets. As such, an IPv6-only host, such as a MN 110, may not be able to or properly receive multicast data from IPv4-only servers, such as the IPv4 host 150. In some applications, multicast communications may be needed for the MNs 110 in PMIPv6, including multicast communications from the IPv4 host 150 to an IPv6-only MN 110. This may be enabled using a multicast translation scheme for PMIPv6, which may be implemented for any source multicast (ASM), any source specific multicast (SSM), or both.

Figure 3:
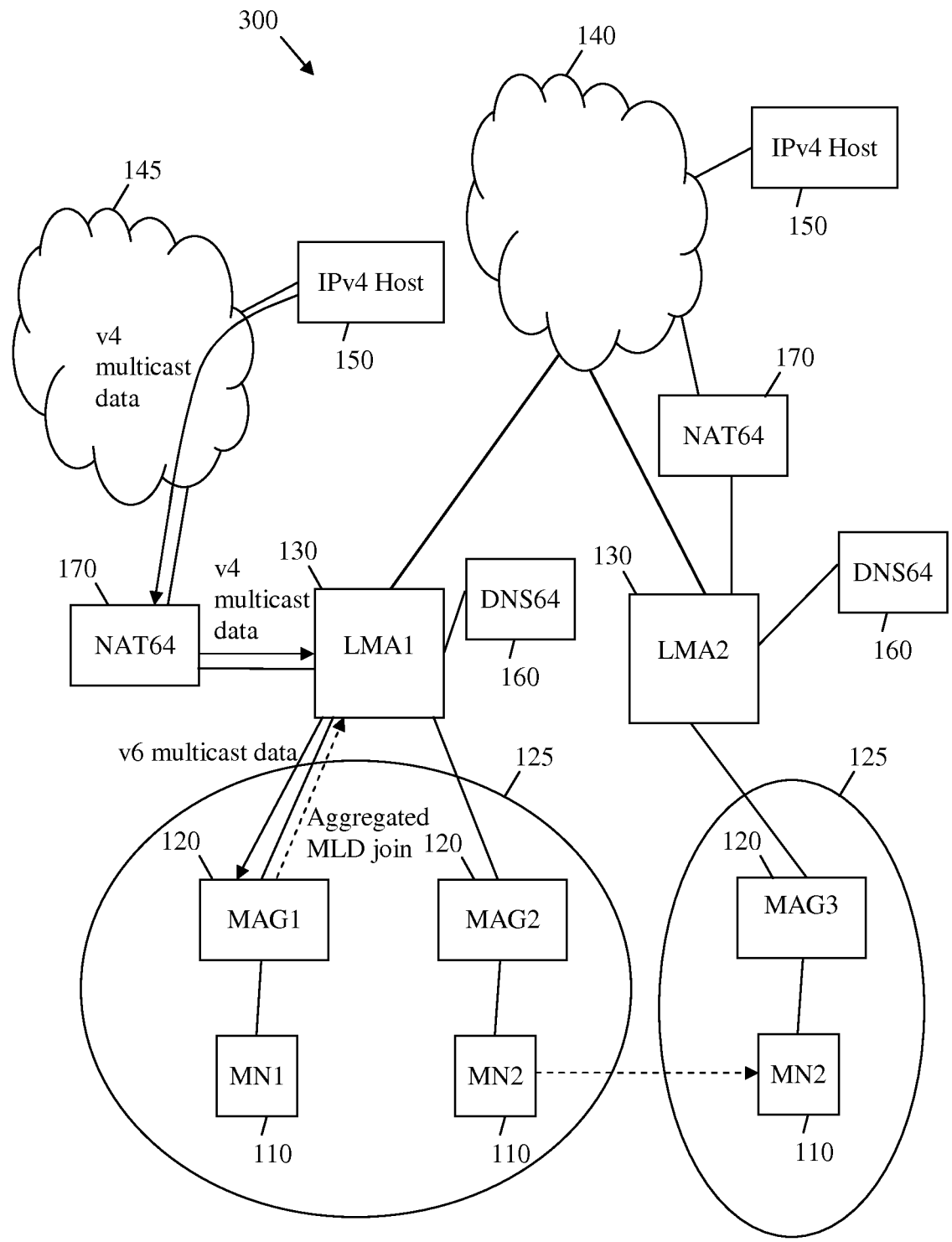
FIG. 3 is a schematic diagram of one embodiment of a multicast scheme.

FIG. 3 illustrates an embodiment of a multicast scheme 300 that may be used in the wireless access network system 100. The multicast scheme 300 may be implemented to allow one or more IPv6-only MNs 110 to receive IPv4 multicast data from the IPv4 host 150 or another IPv4-only content provider based on the multicast scheme supported in PMIPv6 as described in RFC 6224 April 2011 by T. Schmidt et al. entitled "Base Deployment for Multicast Listener Support in PMIPv6 Domains", which is incorporated herein by reference. An IPv6-only MN 110 may join an IPv4 multicast group by sending a multicast listener discover (MLD) Membership Report message, e.g., in an aggregated MLD join message for a plurality of MNs 110, to the LMA 130 (indicated by a dashed line arrow in FIG. 3). The MN 110 may use a synthesized IPv6 address in the message based on an IPv4 multicast group address. For example, a /96 prefix may be used for any source multicast referred to as ASM_MPREFIX64 followed by an IPv4 multicast group address a.b.c.d. The ASM_

MPREFIX64 may be in the form of FF7x8x::/96, as defined in draft-boucadair-behave-64-multicast-address-format-01, February 2011 by M. Boucadair et al. entitled "IPv4-Embedded IPv6 Multicast Address Format", which is incorporated herein by reference, where M bits may be set to about one (M is an integer). The join message from the MN 110 for the group ASM_MPREFIX64:a.b.c.d may be received by a multicast router at the LMA 130.

Each LMA 130 may be assigned a unique MPREFIX64, one for ASM and another for SSM, as described in draft-boucadair-behave-64-multicast-address-format-01. A MN 110 may then learn the LMA's 130 assigned value and create an IPv6 multicast address based on the IPv4 group address a.b.c.d that the MN 110 intends to join. The LMA 130 may act as a multicast anchor that checks the group address and recognizes ASM_MPREFIX64. The LMA 130 may check that the last about 32 bits is an IPv4 multicast address in the range from about 224/8 to about 239/8. If the bits are confirmed, then the LMA 130 may join a.b.c.d using Internet Group Management Protocol (IGMP), e.g., IGMP Membership report messages, on its IPv4 interface.

When the LMA 130 receives multicast data for the group a.b.c.d, the LMA 130 may first obtain the IPv6 address ASM_MPREFIX64:a.b.c.d and then check if at least one MN 110 is subscribed to this address from the binding cache and the multicast state. The LMA 130 may check if the address has any outgoing interfaces towards a MAG 120 where at least one MN 110 subscribed to this address. The LMA 130 may then translate the received IPv4 multicast data packet into an IPv6 multicast data packet. The LMA 130 may include in the packet a destination address that corresponds to the IPv6 group address ASM_MPREFIX64:a.b.c.d and a source address that corresponds to the LMA's IPv6 interface address. A Type of Service (TOS) field in the IPv4 packet may be copied into an IPv6 Traffic Class field in the IPv6 packet. Both an IPv4 Protocol field and a time to live (TTL) field in the IPv4 packet may be copied into an IPv6 Next Header and a Hop Limit field, respectively, in the IPv6 packet. An IPv4 payload in the IPv4 packet may also be copied into an IPv6 payload in the IPv6 packet. Additionally, a UDP checksum may be updated, which may complete the packet translation process, e.g., as described in draft-sarikaya-behave-mcast4nat64-03, March 2011 by B. Sarikaya entitled "Multicast Support for NAT64", which is incorporated herein by reference. The LMA 130 may tunnel the IPv6 packet to the MAG 120 to which the MNs 110 is coupled, e.g., to a Proxy CoA. The MAG 120 may then duplicate the packet for each MN 110 of the group and send each duplicate packet to the individual MNs 110 based on the membership status of the multicast group ASM_MPREFIX64:a.b.c.d. The IPv4 multicast data from the IPv4 host 150 to the LMA 130 and the IPv6 multicast data from the LMA 130 to the MAG 120 are indicated by solid line arrows in FIG. 3.

Further any IPv4 fragments sent by the routers or the LMAs 130 may be translated into IPv6 packets with IPv6 Fragment Headers. A Fragmentation Offset field in the received packet may be copied into a corresponding field in the Fragment Header. An about 16-bit Identification field in the received packet may be copied into about low-order 16 bits of the IPv6 Fragment Header Identification field. The high-order bits of the 32-bit IPv6 Fragment Header Identification field may be set to about zero. A More Fragments (MF) flag in the received packet may be copied to a corresponding field in the IPv6 Fragment Header, as a Master's Thesis, October 2009 by Teemu Kiviniemi at Helsinki University of Technology entitled "Implementation of an IPv4 to IPv6 Multicast Translator", which is incorporated herein by reference.

The multicast translation described above may be MN agnostic, e.g., may be aware of the MN members of a multicast group. The LMA 130 may receive MLD join messages from a proxy instance in one of the coupled MAGs 120 when the (MN) membership database changes. It may be sufficient for the LMA 130 to know if there is at least one (MN) member in the corresponding downstream MLD proxy instance (in a MAG 120), and thus the LMA 130 may not need to check or consult its binding cache.

The multicast translation scheme above may be implemented for the ASM case. The SSM case may also be supported similar to ASM case. In the SSM case, the IPv4 multicast addresses may use a 232.0.0.0/8 prefix and the IPv6 multicast addresses may use a FF3x00008x::/96 prefix. A unique SSM prefix may be configured, such as FF3E::/96. The IPv6 prefix may be referred to as SSM_MPREFIX64, as described in draft-boucadair-behave-64-multicast-address-format-01, where M bits may be set to about one. Since SSM translation may require a unique address for each IPv4 multicast source, an IPv6 unicast prefix may be configured for the translator (e.g., the LMA 130 and/or NAT64 server 170) to represent IPv4 sources. This prefix may be pre-appended to IPv4 source addresses in the received packets. The prefix may also be routed towards the translator on the IPv6 network, e.g., to enable reverse path forwarding for multicast and/or to inform other Protocol Independent Multicast (PIM) routers about the correct destination for PIM (S,G) Join messages, e.g., as described in Teemu Kiviniemi's Master's Thesis.

During a handover, multicast translation may depend on how the MPREFIX64 is configured. The MN 110 may obtain a different MPREFIX64 locally after moving to a new MAG 120. The MN 110 may send a join request (a MLD Report message) with a new multicast group address to the LMA 130. The LMA 130 may add this group address to its membership database. The LMA 130 may add the new MPREFIX64 to the multicast prefix table.

Another issue of implementing NAT64 in PMIPv6 is the handling routing between MNs. Localized routing in PMIPv6 is used to avoid reverse tunneling packets from the MNs 110 to the LMAs 130. Instead, a MAG 120 for a first MN 110 may be configured to directly send the packets to another MAG 120 for a second MN 110, e.g., as described in draft-ietf-netext-pmip-lr-02, (work in progress) by S. Krishnan et al. entitled "Localized Routing for Proxy Mobile IPv6", which is incorporated herein by reference. The other MAG 120 may be coupled to the same LMA 130 of the first MAG 120 or to another LMA 130, e.g., in another domain.

Since NAT64 protocol for PMIPv6 may be supported at the LMA 130 (that is coupled to a NAT64 server 170) and not at the MAG 120, NAT64 for PMIPv6 may not be used when implementing localized routing by the MAGs 120. To ensure proper support for NAT64 in PMIPv6, an EnableMAGLocalRouting flag may be set to 0 at the MAG 120 to disable both local routing as in RFC 5213, which is incorporated herein by reference, and localized routing as in draft-ietf-netext-pmip-lr-02. Since the NAT64 protocol assumes that the MNs communicate with IPv4 servers or hosts 150, the IPv4 servers or hosts 150 may not be expected to be associated with any MAG in the domain. Thus, there may be no trigger or situation to initiate localized routing for communications between the MNs 110 and the IPv4 servers or hosts 150, and hence localized routing may not be an issue in this case.

To handle the issues above, some extensions may be made to PMIPv6. The extensions may include adding a flag to the BCE at the LMA 130 to indicate whether a MN 110 associated with the entry is an IPv6-only MN 130. The BCE may also comprise a prefix (Pref64) that may be used to route NAT64 traffic to the NAT64 server 170. An IPv6-only flag may also be set after receiving the first IPv6 packet that comprises a synthetic IPv6 address. This flag may be used to connect the binding cache with the NAT table. Further, the LMA 130 may be configured with a table of NAT64 prefixes, which may correspond to a plurality of Pref64 values that are supported in PMIPv6 home domain and possibly its roaming partners. If the well-known prefix is used, then the table may comprise the prefix 64:FF9B::/96.

Additional multicast extensions may also be supported to handle the issues above. The extensions may include configuring a multicast anchor at the LMA to support at least one ASM_MPREFIX64 prefix value and one SSM_MPREFIX64 prefix value. The multicast anchor at the LMA may also support IGMP on its IPv4 interface. The LMA may comprise a table of ASM_MPREFIX64 values and SSM_MPREFIX64 values. Typically, the table may comprise a single entry, e.g., the local prefix value. The table may be extended to comprise additional entries in case of handover, as described above. The entries may be kept as soft-state and removed after a period of inactivity. The multicast anchor at the LMA may support at least one SSM_MPREFIX64 prefix value. The multicast anchor at the LMA may also support IGMP version three (IGMPv3) on its IPv4 interface since a source filtering needed for SSM may only be supported by IGMPv3 (and not by IGMP version 2 (IGMPv2)). Alternatively, the multicast anchor at the LMA 130 may support Protocol Independent Multicast (PIM) on its IPv4 interface since PIM provides SSM and source filtering support.

Additionally, IPv4-only or dual stack mobile nodes security considerations described in RFC 5844, which is incorporated herein by reference, may apply for the system and methods described above. The security considerations in RFC 5844 may not apply for the case of IPv6-only MNs. For the IPv4 interface of the LMA 130, similar security consideration as described in RFC 6146 may apply.

Figure 4:
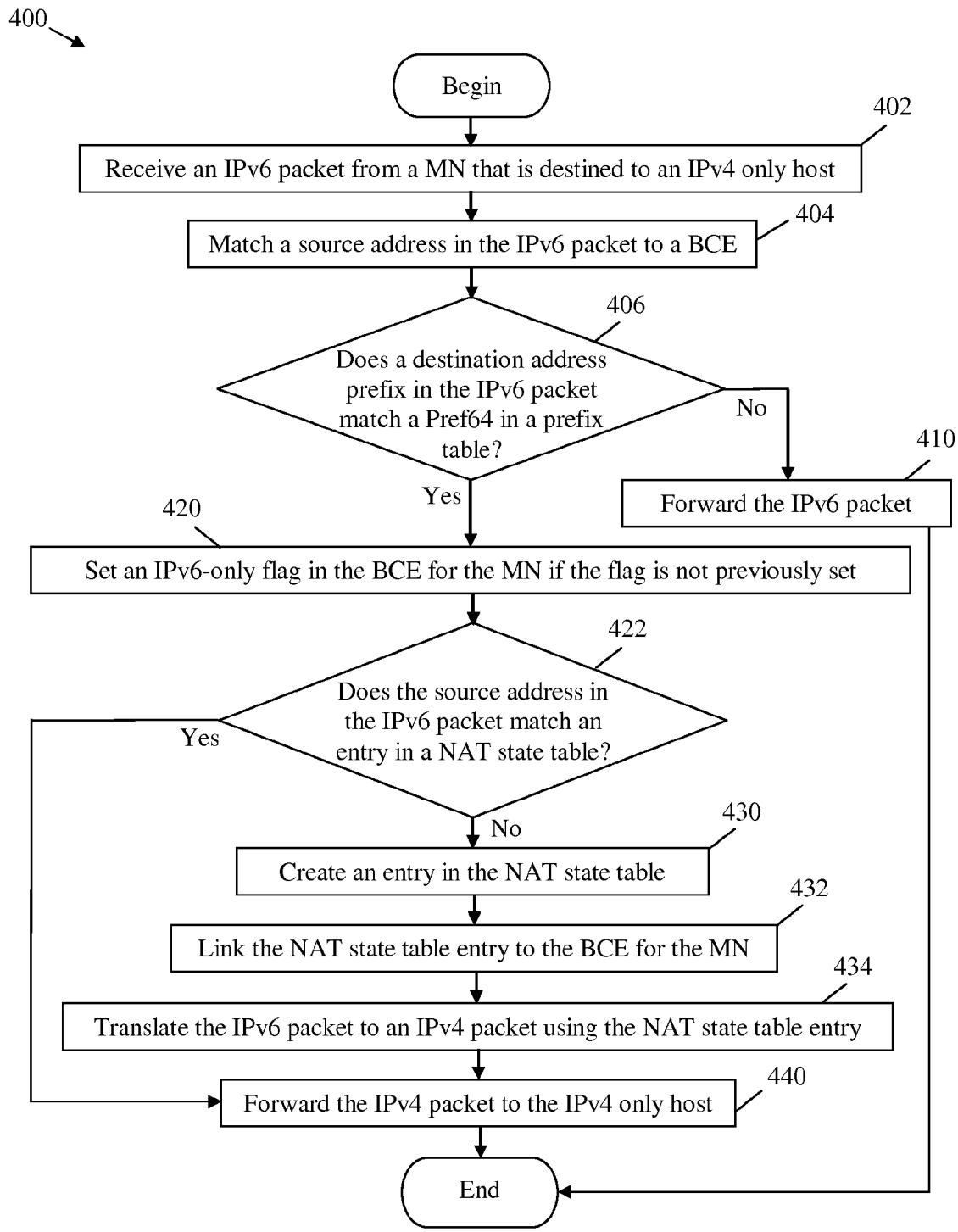
FIG. 4 is a flowchart of an embodiment of a packet translation method.

FIG. 4 illustrates an embodiment of a packet translation method 400 that may be implemented by a LMA and a NAT64 server that may be colocated or separated. The method 400 may be implemented to forward a packet from an IPv6-only MN to an IPv4-only host or server. The method 400 may begin at block 402, where an IPv6 packet that is destined to an IPv4 only host may be received from a MN. The packet may comprise an IPv6 source address that may be associated with the MN and an IPv6 destination address that may be associated with the IPv4-only host and/or another destination. At block 404, a source address in the IPv6 packet may be matched to a BCE (e.g., in a binding cache at the LMA). The BCE may associate the MN's address (e.g., IPv6 address) to a LMA CoA. At block 406, the method 400 may determine whether a destination address prefix in the IPv6 packet matches a Pref64 in a prefix table. The prefix table may link one or more destination address prefixes to a DNS64 server. If the condition in block 406 is met, then the method may proceed to block 420. Otherwise, the method 400 may proceed to block 410.

At block 410, the IPv6 packet may be forwarded, e.g., without translation. For instance, the IPv6 packet may be destined or intended to an IPv6 host in addition to or instead of the IPv4-only host. The method 400 may then end. At block 420, an IPv6-only flag may be set, e.g., to about one, in the BCE for the MN if the flag is not previously set. At block 422, the method 400 may determine whether the source address in the IPv6 packet matches an entry in a NAT state table. If the condition in block 422 is met, then the method 400 may proceed to block 440. Otherwise, the method 400 may proceed to block 430.

At block 430, an entry may be created in the NAT state table. The entry may associate the MN's IPv6 source address and an IPv6 source port with an IPv4 interface address and an IPv4 source port. The entry may also comprise the IPv6-only flag that is set, the Pref64, and a keepalive interval. At block 432, the NAT state table entry may be linked to the BCE for the MN. At block 434, the IPv6 packet may be translated to an IPv4 packet using the NAT state table entry. The IPv4 packet may comprise an IPv4 address that corresponds to the IPv6 address and is supported by the IPv4-only host. The packet may be translated by the LMA if the LMA and the NAT64 server are colocated or may be sent by the LMA to the NAT64 server for translation if the LMA and the NAT64 server are separated. At block 440, the IPv4 packet may be forwarded to the IPv4-only host. The method 400 may then end.

Figure 5:
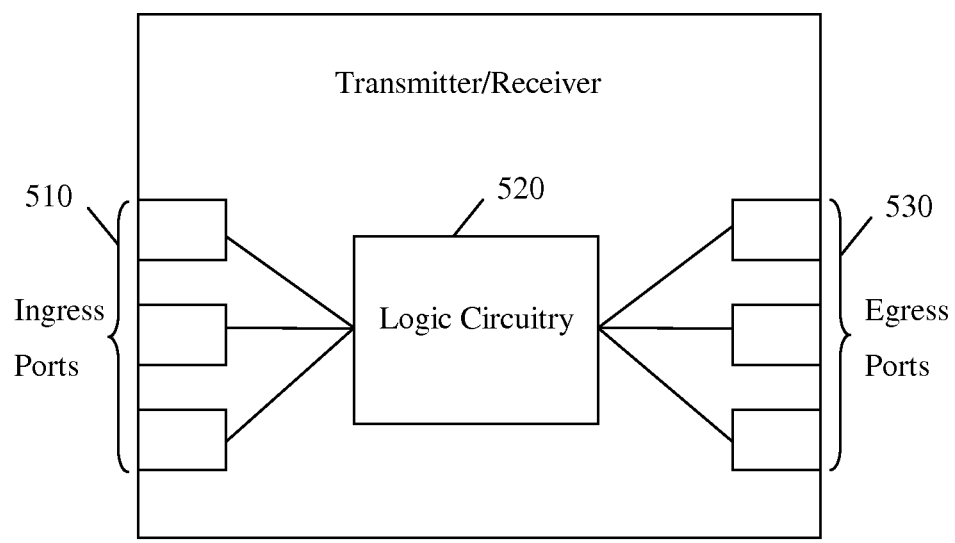
FIG. 5 is a schematic diagram of an embodiment of a transmitter/receiver unit.

FIG. 5 illustrates an embodiment of a transmitter/receiver unit 500, which may be any device that transports packets through a network. For instance, the transmitter/receiver unit 500 may be located in any of the network components described above. The transmitted/receiver unit 500 may comprise one or more ingress ports or units 510 for receiving packets, objects, or Type Length Values (TLVs) from other network components, logic circuitry 520 to determine which network components to send the packets to, and one or more egress ports or units 530 for transmitting frames to the other network components.

Figure 6:
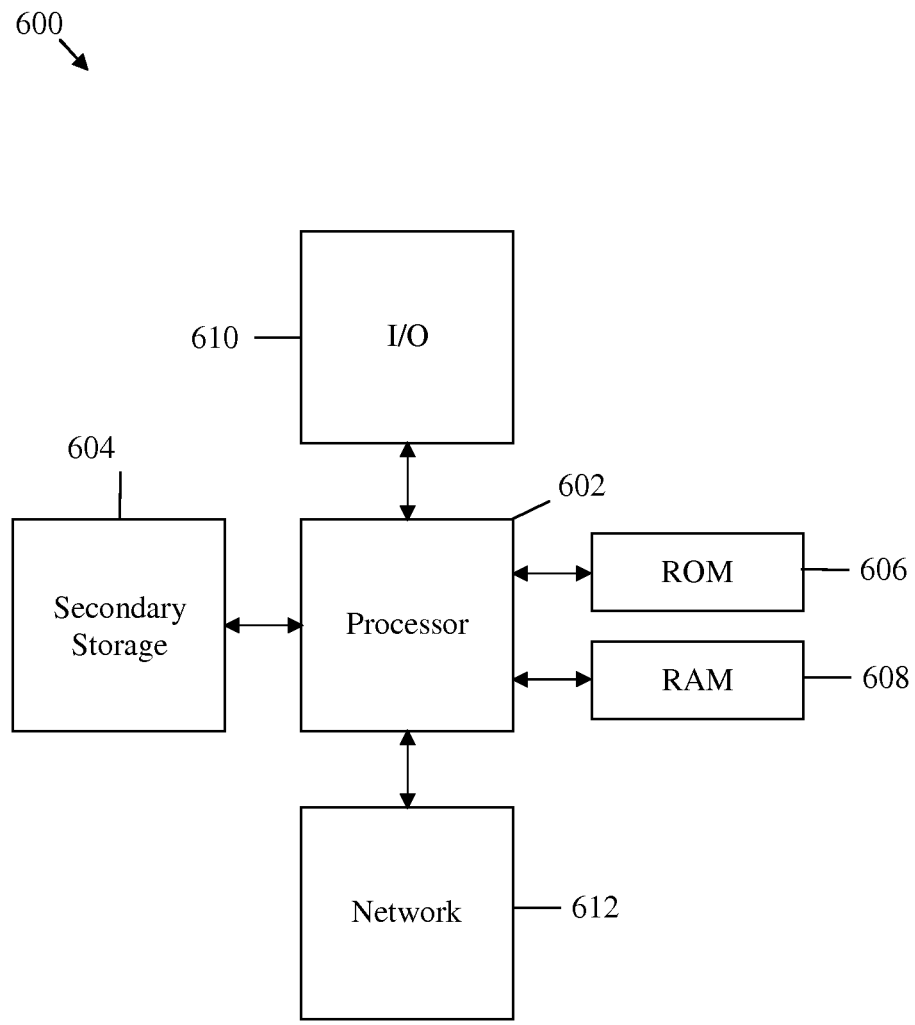
FIG. 6 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to second storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a router acting as a Proxy Mobile Internet Protocol version 6 (PMIPv6) Local Mobility Anchor (LMA), wherein the router comprises a hardware processor configured to implement the method, the method comprising:
    receiving a proxy binding update for a mobile node (MN) from a media access gateway (MAG);
    creating a binding cache entry (BCE) for the MN;
    sending a proxy binding acknowledgement to the MAG;
    receiving an Internet Protocol (IP) version six (IPv6) packet from a mobile node (MN) wirelessly connected to the MAG, wherein the IPv6 packet comprises a source address and a destination address, wherein the source address is the MN's IPv6 address, and wherein the destination address comprises a IPv6 prefix;
    matching the source address in the IPv6 packet to the BCE;
    determining whether the IPv6 prefix in the destination address of the IPv6 packet matches a prefix stored in a prefix table;
    forwarding the IPv6 packet to an IPv6 host when the IPv6 prefix in the destination address of the IPv6 packet matches the prefix stored in the prefix table;
    determining whether an IPv6 only flag in the BCE for the MN has been set when the IPv6 prefix in the destination address of the IPv6 packet does not match the prefix stored in the prefix table, wherein the IPv6 packet is destined to an IPv4 host that does not support IPv6 when the IPv6 prefix in the destination address of the IPv6 packet does not match the prefix stored in the prefix table;
    setting the IPv6 only flag in the BCE for the MN when the IPv6 prefix in the destination address of the IPv6 packet does not match the prefix stored in the prefix table; and
    processing multicast messages sent by the IPv4 host to the MN.

2. The method of claim 1, further comprising:
    determining that the source address of the IPv6 packet does not match an entry in a network address translation (NAT) state table;
    creating a new entry in the NAT state table;
    linking the new entry in the NAT state table to the BCE for the MN;
    translating the IPv6 packet into an IPv4 packet using the new entry for the NAT state table; and
    forwarding the IPv4 packet to the IPv4 host.

3. The method of claim 2, wherein the new entry in the NAT state table associates the source address and an IPv6 port at the router on which the IPv6 packet was received with an IPv4 address for the IPv4 host and an IPv4 port on the router on which IPv4 packets are sent to the IPv4 host.

4. The method of claim 3, wherein the router supports Protocol Independent Multicast (PIM) on the IPv4 port.

5. The method of claim 1, further comprising:
    determining that the source address of the IPv6 packet matches an entry in a network address translation (NAT) state table;
    translating the IPv6 packet into an IPv4 packet; and
    forwarding the IPv4 packet to the IPv4 host.

6. The method of claim 1, further comprising instructing the MAG to disable localized routing between the MAG and another MAG by setting an EnableMAGLocalROuting flag to zero.

7. A router acting as a Proxy Mobile Internet Protocol version 6 (PMIPv6) Local Mobility Anchor (LMA), the router comprising:
    a receiver configured to receive a proxy binding update for a mobile node (MN) from a media access gateway (MAG);
    a processor configured to create a binding cache entry (BCE) for the MN;
    a transmitter configured to send a proxy binding acknowledgement to the MAG,
    wherein the receiver is further configured to receive an Internet Protocol (IP) version six (IPv6) packet, wherein the IPv6 packet comprises a source address and a destination address, wherein the source address is the MN's IPv6 address, and wherein the destination address comprises a IPv6 prefix, wherein the processor is further configured to
  match the source address in the IPv6 packet to the BCE;
  determine whether the IPv6 prefix in the destination address of the IPv6 packet matches a prefix stored in a prefix table;
  forward the IPv6 packet to an IPv6 host when the IPv6 prefix in the destination address of the IPv6 packet matches the prefix stored in the prefix table;
  determine whether an IPv6 only flag in the BCE for the MN has been set when the IPv6 prefix in the destination address of the IPv6 packet does not match the prefix stored in the prefix table;
  set the IPv6 only flag in the BCE for the MN when the IPv6 prefix in the destination address of the IPv6 packet does not match the prefix stored in the prefix table; and
  process multicast messages sent by an IP version 4 (IPv4) host to the MN, and wherein the IPv4 host does not support IPv6.

8. The router of claim 7, wherein the transmitter is further configured to send keepalive messages to a network address translation (NAT) server that is coupled to and external to the router, wherein the keepalive messages refresh an entry for the MN in a NAT table in the NAT server, wherein the MN does not send any keepalive messages to the LMA and does not send any keepalive messages to the MAG, wherein the NAT state table entry is linked to the BCE for the MN, and wherein the BCE maps an IP address of the MN to a care-of-address (CoA) for the MN.

9. The router of claim 8, wherein the keepalive messages are Internet Control Message Protocol (ICMP) Echo Request messages.

10. The router of claim 9, wherein the ICMP Echo Request messages are ICMP version 6 (ICMPv6) Echo Request messages, wherein the NAT server is configured to translate the ICMPv6 Echo Request messages into ICMP version 4 (ICMPv4) Echo Request messages, and wherein the NAT server is configured to send the ICMPv4 Echo Request messages to the IPv4 host.

11. The router of claim 10, wherein the ICMPv6 Echo Request messages are encoded with a User Datagram Protocol (UDP) header.

12. The router of claim 11, wherein a keepalive packet has a second source address and a second destination address, and wherein the second source address is the MN's IP address.

13. A network component comprising:
  a transmitter;
  a receiver at a Local Mobility Anchor (LMA) configured to receive an Internet Protocol version six (IPv6) packet, wherein the IPv6 packet comprises a source address and a destination address, wherein the source address is a mobile node's (MN's) IPv6 address, and wherein the destination address comprises an IPv6 prefix,
  a processor at the LMA that is coupled to the receiver and configured to:
    match the source address in the IPv6 packet to a Binding Cache Entry (BCE);
    determine whether the IPv6 prefix in the destination address of the IPv6 packet matches a prefix stored in a prefix table;
    forward the IPv6 packet to an IPv6 host when the IPv6 prefix in the destination address of the IPv6 packet matches the prefix stored in the prefix table;
    determine whether an IPv6 only flag in the BCE for the MN has been set when the IPv6 prefix in the destination address of the IPv6 packet does not match the prefix stored in the prefix table; and
    set the IPv6 only flag in the BCE for the MN when the IPv6 prefix in the destination address of the IPv6 packet does not match the prefix stored in the prefix table;
  wherein the receiver is further configured to receive an Internet Protocol (IP) version four (IPv4) multicast data packet that comprises an IPv4 address from an IPv4 host;
  wherein the processor is further configured to translate the IPv4 multicast data packet into an IPv6 multicast data packet that comprises an IPv6 address based on the IPv4 address; and
  wherein the transmitter is configured to send the IPv6 multicast data packet to a mobile access gateway (MAG) associated with a plurality of the mobile nodes (MNs) that are subscribed to the IPv6 address, and
  wherein the LMA supports source-specific multicast (SSM) and Protocol Independent Multicast (PIM) on an upstream interface of the LMA.

14. A router acting as a Proxy Mobile Internet Protocol version 6 (PMIPv6) Local Mobility Anchor (LMA), the router comprising:
  a receiver configured to receive a proxy binding update for a mobile node (MN) from a media access gateway (MAG);
  a processor configured to create a binding cache entry (BCE) for the MN;
  a transmitter configured to send a proxy binding acknowledgement to the MAG,
  wherein the receiver is further configured to subsequently receive a Multicast Listener Discovery (MLD) Join message for the MN from the MAG,
  wherein the processor is further configured to translate the MLD Join message into an Internet Group Management Protocol (IGMP) Join message,
  wherein the transmitter is further configured to send the IGMP Join message to an Internet Protocol (IP) version four (IPv4) host, thereby joining the MN to a multicast group to which the IPv4 host sends IPv4 multicast data packets,
  wherein the receiver is further configured to receive an IP version six (IPv6) packet, wherein the IPv6 packet comprises a source address and a destination address, wherein the source address is the MN's IPv6 address, and wherein the destination address comprises a IPv6 prefix,
  wherein the processor is further configured to:
    match the source address in the IPv6 packet to the BCE;
    determine whether the IPv6 prefix in the destination address of the IPv6 packet matches a prefix stored in a prefix table;
    forward the IPv6 packet to an IPv6 host when the IPv6 prefix in the destination address of the IPv6 packet matches the prefix stored in the prefix table;
    determine whether an IPv6 only flag in the BCE for the MN has been set when the IPv6 prefix in the destination address of the IPv6 packet does not match the prefix stored in the prefix table; and
    set the IPv6 only flag in the BCE for the MN when the IPv6 prefix in the destination address of the IPv6 packet does not match the prefix stored in the prefix table;

wherein the receiver is further configured to receive the IPv4 multicast data packets from the IPv4 host, wherein the IPv4 multicast data packets comprise an IPv4 destination address and an IPv4 source address, wherein the processor is further configured to translate the IPv4 multicast data packets into IP version six (IPv6) multicast data packets by adding an IPv6 prefix onto the IPv4 destination address, and wherein the transmitter is further configured to tunnel the IPv6 multicast data packets to the MAG using a proxy Care of Address (CoA) for the MN.

15. The router of claim 14, wherein the MLD Join request comprises a plurality of individual MLD Join requests that have been aggregated together by the MAG, wherein each individual MLD Join request is for one of a plurality of the MNs wirelessly connected to the MAG, and wherein the MAG is configured to duplicate the IPv6 multicast data packets and send the tunneled IPv6 multicast data packets to each of the MNs.

16. The router of claim 14, wherein the processor does not check the BCE when translating the IPv4 multicast data packets into IPv6 multicast data packets.

17. The router of claim 14, wherein the processor is further configured to confirm that the last 32 bits of an IPv4 multicast address in the IGMP Join message are in a range from 224/8 to 239/8 prior to the receiver sending the IGMP Join message to the IPv4 host.

18. The router of claim 14, wherein a second source address of the IPv6 multicast packets sent to the MAG is an IPv6 interface address for the LMA.

19. The router of claim 14, wherein translating the IPv4 multicast data packets into the IPv6 multicast data packets comprises:
 copying a type of service (TOS) field from the IPv4 multicast data packets into a traffic class field in the IPv6 multicast data packets;
 copying an IPv4 protocol field from the IPv4 multicast data packets into a next header field in the IPv6 multicast data packets;
 copying a time to live (TTL) field from the IPv4 multicast data packets into a hop limit field in the IPv6 multicast data packets; and
 copying an IPv4 payload from the IPv4 multicast data packets into an IPv6 payload in the IPv6 multicast data packets.

20. The router of claim 14, wherein at least some of the IPv4 multicast data packets are IPv4 fragment packets, and wherein translating the IPv4 multicast data packets into the IPv6 multicast data packets comprises:
 copying a fragmentation offset field from the IPv4 multicast data packets into a fragment header in the IPv6 multicast data packets;
 copying a 16-bit identification field from the IPv4 multicast data packets into a low-order 16 bits of the IPv6 fragment header identification field;
 setting the high-order bits in the IPv6 fragment header identification field to zero; and
 copying a more fragment (MF) field from the IPv4 multicast data packets into a MF field in the IPv6 multicast data packets.

21. The router of claim 14, wherein the LMA sends a plurality of keepalive messages based on a determined keepalive interval to a network address translation (NAT) server instead of the MN to refresh a NAT state table entry that is associated with the BCE for the MN, and wherein the keepalive messages are Internet Control Message Protocol (ICMP) Echo Request messages that each comprise a User Datagram Protocol (UDP) header and serve as outbound refresh messages for outgoing packets to the IPv4 host.

22. The router of claim 21, wherein the LMA receives a plurality of keepalive messages based on a determined time interval from the NAT server to refresh the BCE for the MN, and wherein the keepalive messages are ICMP Echo Reply messages that serve as inbound refresh messages for incoming packets from the IPv4 host.

23. The router of claim 22, wherein the NAT state table entry comprises an IPv6 prefix (Pref64) that is assigned to the NAT server and the keepalive interval for keeping alive a communication session for the MN.

\* \* \* \* \*